United States Patent
Zavesky et al.

(10) Patent No.: US 10,448,094 B2
(45) Date of Patent: *Oct. 15, 2019

(54) VIDEO MOTION AUGMENTATION

(71) Applicant: AT&T Intellectual Property I, L.P., Atlanta, GA (US)

(72) Inventors: Eric Zavesky, Austin, TX (US); James E. Jackson, Austin, TX (US); James H. Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/879,839

(22) Filed: Jan. 25, 2018

(65) Prior Publication Data

US 2018/0152757 A1 May 31, 2018

Related U.S. Application Data

(63) Continuation of application No. 14/925,233, filed on Oct. 28, 2015, now Pat. No. 9,883,235.

(51) Int. Cl.
*H04N 21/44* (2011.01)
*G06K 9/00* (2006.01)
(Continued)

(52) U.S. Cl.
CPC ... *H04N 21/44008* (2013.01); *G06F 16/9577* (2019.01); *G06K 9/00335* (2013.01);
(Continued)

(58) Field of Classification Search
CPC combination set(s) only.
See application file for complete search history.

(56) References Cited

U.S. PATENT DOCUMENTS 8,265,457 B2 9/2012 Baum et al.
8,307,286 B2 11/2012 Sterner et al.
(Continued)

FOREIGN PATENT DOCUMENTS

CA 2605558 11/2006
CN 103002330 3/2013
(Continued)

OTHER PUBLICATIONS

Hartsell et al., "Video streaming in online learning." AACE Journal 14.1 (2006): 31-43. http://www.editlib.org/p/6152/article_6152.pdf.
(Continued)

*Primary Examiner* — Hai V Tran
(74) *Attorney, Agent, or Firm* — Akerman LLP; Michael K. Dixon; Mammen (Roy) P. Zachariah, Jr.

(57) ABSTRACT

A system for providing video motion augmentation is disclosed. In particular, the system provides mechanisms for analyzing video content, metadata, or a combination thereof, to dynamically enhance and adapt regions of small movements or micro-movements in the video content based on a variety of inputs. The regions of small movements or micro-movements may be enhanced based on device characteristics associated with a device consuming the video content, based on a theme associated with the content, based on sensor data, based on user feedback, and based on a variety of other inputs. For example, motion content in the video content may be enhanced and emphasized based on the display resolution or other device characteristics of a device requesting the video content. Once the enhanced video content is generated based on the inputs, the enhanced content may be provided to the device requesting the content.

20 Claims, 6 Drawing Sheets

(51) Int. Cl.

| | | |
|---|---|---|
| *H04N 21/61* | (2011.01) | |
| *H04N 21/431* | (2011.01) | |
| *H04N 21/41* | (2011.01) | |
| *H04N 21/435* | (2011.01) | |
| *H04N 21/45* | (2011.01) | |
| *H04N 21/234* | (2011.01) | |
| *H04N 21/2343* | (2011.01) | |
| *H04N 21/258* | (2011.01) | |
| *G06T 5/00* | (2006.01) | |
| *H04N 21/475* | (2011.01) | |
| *G06F 16/957* | (2019.01) | |
| *G06T 5/50* | (2006.01) | |

(52) U.S. Cl.
CPC ............ *G06K 9/00744* (2013.01); *G06T 5/00* (2013.01); *G06T 5/50* (2013.01); *H04N 21/23418* (2013.01); *H04N 21/23439* (2013.01); *H04N 21/234363* (2013.01); *H04N 21/25825* (2013.01); *H04N 21/4126* (2013.01); *H04N 21/431* (2013.01); *H04N 21/4358* (2013.01); *H04N 21/4516* (2013.01); *H04N 21/4758* (2013.01); *H04N 21/6131* (2013.01); *G06T 2207/10016* (2013.01)

(56) References Cited

U.S. PATENT DOCUMENTS

| | | |
|---|---|---|
| 8,380,047 B2 | 2/2013 | Kojo et al. |
| 8,751,604 B2 | 6/2014 | Liebman |
| 8,910,051 B2 | 12/2014 | Lussier et al. |
| 8,949,887 B2 | 2/2015 | Mehta et al. |
| 9,032,298 B2 | 5/2015 | Segal et al. |
| 2001/0004417 A1 | 6/2001 | Narutoshi et al. |
| 2002/0116716 A1 | 8/2002 | Sideman |
| 2008/0209480 A1 | 8/2008 | Eide et al. |
| 2010/0269130 A1* | 10/2010 | Gupta ............... H04N 5/76 725/28 |
| 2011/0191802 A1 | 8/2011 | Haberman et al. |
| 2013/0080516 A1 | 3/2013 | Bologh |
| 2013/0312042 A1* | 11/2013 | Shaw ........... H04N 21/23439 725/62 |
| 2014/0033134 A1 | 1/2014 | Pimmel et al. |
| 2014/0270681 A1* | 9/2014 | Sen ................. G11B 31/00 386/201 |
| 2014/0280702 A1 | 9/2014 | Barker et al. |
| 2014/0304602 A1 | 10/2014 | Lettau et al. |
| 2015/0268822 A1* | 9/2015 | Waggoner ......... G06F 3/04842 715/722 |
| 2016/0358634 A1* | 12/2016 | Molgaard ......... G06K 9/00268 |

FOREIGN PATENT DOCUMENTS

| | | |
|---|---|---|
| DE | 602004011114 | 1/2009 |
| JP | 2001256210 | 9/2001 |
| JP | 2007150994 | 6/2007 |

OTHER PUBLICATIONS

Pea et al., "The diver project: interactive digital video repurposing." MultiMedia, IEEE 11.1 (2004): 54-61. https://telearn.archives-ouvertes.fr/hal-00190618/document.

Gürses et al., "A simple and effective mechanism for stored video streaming with TCP transport and server-side adaptive frame discard." Computer Networks 48.4 (2005): 489-501. http://kilyos.ee.bilkent.edu.tr/~akar/papers/gurses_akar_akar_comnet05.pdf.

Cattelan et al. "Watch-and-comment as a paradigm toward ubiquitous interactive video editing." ACM Transactions on Multimedia Computing, Communications, and Applications (TOMM) 4.4 (2008): 28. http://www.researchgate.net/profile/Rudinei_Goularte/publication/234787779_Watch-and-comment_as_a_paradigm_toward_ubiquitous_interactive_video_editing/links/54cc10820cf24601c08a0beb.pdf.

* cited by examiner

VIDEO MOTION AUGMENTATION

CROSS-REFERENCE TO RELATED APPLICATION

This application is a continuation of and claims priority to U.S. patent application Ser. No. 14/925,233, filed Oct. 28, 2015, which is herein incorporated by reference in its entirety.

FIELD OF THE INVENTION

The present application relates to technologies for video technologies, motion technologies, media enhancement technologies, and content delivery networks, and more particularly, to a system and method for providing video motion augmentation.

BACKGROUND

In today's society, users are increasingly utilizing network and other service providers to gain access to the Internet, access software services, request and receive various types of content, access software applications, and perform a variety of other tasks and functions. In order to handle large volumes of requests from users requesting various types of content, services, and applications, content providers often employ the use of content delivery networks and systems to serve the content and provide the services to the users in a more efficient and effective manner. Content delivery networks are particularly useful when high performance, reliability, scalability, and cost savings associated with distributing the content and providing the services are important to the content providers that provide the content, services, and software applications. Additionally, content delivery networks are useful in optimizing the delivery of video content to a multitude of users and organizations based on their bandwidth constraints.

While current implementations of content delivery networks provide substantial benefits to users and content providers, there is still significant room to enhance current methodologies and technologies for augmenting the content that is delivered by content delivery networks and improving the content delivery experience for users. For example, currently, on a large display device, various types of small or micro-movements may be easily observed by one or more users. However, on devices with limited display capabilities or on smaller devices, such small or micro-movements may not be readily observable. Additionally, for certain types of video content and environments, there may be excessive movement that may interfere with the viewing experience. For example, when a user is on a train, the movement of the train travelling on a set of train tracks may interfere with the user's viewing of media content. As a result, content delivery networks and the various methods of utilizing content delivery networks to deliver media content may be modified so as to provide enhanced quality-of-service for users. Such enhancements and improvements to content delivery networks may provide for improved customer satisfaction and increased revenue for content providers and service providers.

SUMMARY

A system and accompanying methods for providing video motion augmentation are disclosed. In particular, the system and methods may provide mechanisms for analyzing video content, metadata, or a combination thereof, to dynamically enhance and adapt regions of small movements or micro-movements in the video content based on a variety of inputs. In order to accomplish the foregoing, the system and methods may involve receiving a request for media content from a device, and receiving a communication indicating one or more device characteristics associated with the device. Based on the one or more device characteristics, motion content or other content in a first version of the media content may be enhanced. The system and methods may then include generating a second version of the media content that includes the enhanced motion content. The system and methods may include receiving any number of additional inputs, which may be utilized for enhancing content in the media content. For example, inputs indicating display characteristics of a display device, indicating a theme associated with the media content, indicating sensor data obtained from sensors of the device, indicating user-specific feedback or aggregated system-wide feedback, indicating embedded metadata generated by content providers for the media content, other inputs, or a combination thereof, may be utilized according to the systems and methods to further enhance the content to create another version of the media content. Once the motion content or other content is enhanced, the second version of the media content or any subsequent version of the media content may be transmitted to the device requesting the media content for display.

In certain embodiments, the system and methods may include enabling the analysis, enhancement, and/or augmentation of the media content to be performed server-side, such as at a content provider server, service provider server, and/or at a cloud-based server. In other embodiments, the system and methods may include performing the analysis, enhancement, and/or augmentation of the media content on the client-side, such as via an application embedded on the device requesting the content. Additionally, in certain embodiments, the system and methods may include augmenting and/or enhancing media content based on the type of environment that the device requesting the media content is located in. For example, the media content may be enhanced based on whether the device is located in a car, train, boat, plane or other vehicle. Furthermore, the system and methods may include enhancing or even reducing the quality of the content based on bandwidth constraints, the types of services the user of the device has subscribed to, the type of the device requesting the content, based on any factor, or any combination thereof.

In one embodiment, a system for providing video motion augmentation is disclosed. The system may include a memory that stores instructions and a processor that executes the instructions to perform various operations of the system. The system may perform an operation that includes receiving, from a device, a request for media content. In response to the request for the media content, the system may perform an operation that includes transmitting a first version of the media content to the device. During transmission of the first version of the media content or prior to transmission of the first version of the media content, the system may perform an operation that includes receiving a communication indicating a device characteristic of the device. The system may then perform an operation that includes enhancing a portion of the first version of the media content based on the device characteristic of the device. In certain embodiments, the portion of the first version of the media content that is enhanced may be motion content in the first version of the media content. The system may proceed to perform an operation that includes generating a second version of the media content that includes the portion of the first version of the media content that is enhanced based on the device characteristic of the device. Finally, the system may perform an operation that includes transmitting, to the device, the second version of the media content for display on the device.

In another embodiment, a method for providing video motion augmentation is disclosed. The method may include utilizing a memory that stores instructions, and a processor that executes the instructions to perform the various functions of the method. In particular, the method may include receiving a request for media content from a device. Additionally, the method may include receiving a communication indicating a device characteristic of the device. The method may then include enhancing a portion of a first version of the media content based on the device characteristic of the device. In certain embodiments, the portion of the first version of the media content that is enhanced may be motion content in the first version of the media content. Once the portion of the first version of the media content is enhanced, the method may include generating a second version of the media content including the portion of the first version of the media content enhanced based on the device characteristic of the device. The method may then include transmitting, to the device and in response to the request for the media content, the second version of the media content for display on the device.

According to yet another embodiment, a computer-readable device having instructions for providing video motion augmentation is provided. The computer instructions, which when loaded and executed by a processor, may cause the processor to perform operations including: receiving, from a device, a request for media content; receiving a communication indicating a device characteristic of the device; enhancing a portion of a first version of the media content based on the device characteristic of the device, wherein the portion enhanced comprises motion content in the first version of the media content; generating a second version of the media content including the portion of the first version of the media content enhanced based on the device characteristic of the device; and transmitting, to the device and in response to the request, the second version of the media content for display on the device.

These and other features of the systems and methods for providing video motion augmentation are described in the following detailed description, drawings, and appended claims.

DETAILED DESCRIPTION OF THE INVENTION

A system 100 and accompanying methods for providing video motion augmentation are disclosed. In particular, the system 100 and methods may provide mechanisms for analyzing video content, metadata, or a combination thereof, to dynamically enhance and adapt regions of small movements or micro-movements in the video content based on a variety of inputs. In order to accomplish the foregoing, the system 100 and methods may include receiving a request for media content from a device, along with a communication indicating one or more device characteristics associated with the device. Based on the one or more device characteristics, motion content or other content in a first version of the media content may be enhanced based on the functionality of the system 100. The system 100 and methods may then include generating a second version of the media content that includes the enhanced motion content.

Notably, the system 100 and methods may include receiving any number of additional inputs, which may be utilized to also enhance content in the media content. For example, inputs indicating display characteristics of a display device, indicating a theme associated with the media content, indicating sensor data obtained from sensors of the device, indicating user-specific feedback or aggregated system-wide feedback, indicating embedded metadata generated by content providers for the media content, other inputs, or a combination thereof, may be utilized according to the system 100 and methods to further enhance the content to create another version of the media content. Once the motion content or other content is enhanced, the second version of the media content or any subsequent version of the media content may be transmitted to the device requesting the media content. The device may then display the enhanced media content.

In certain embodiments, the system 100 and methods may include enabling the analysis, enhancement, and/or augmentation of the media content to be performed server-side, such as at a content provider server, service provider server, and/or at a cloud-based server. In other embodiments, the system 100 and methods may include performing the analysis, enhancement, and/or augmentation of the media content on the client-side, such as via an application embedded on the device requesting the content. Additionally, in certain embodiments, the system 100 and methods may including augmenting and/or enhancing the media content based on the type of environment that the device requesting the media content is located in. For example, the media content may be enhanced based on whether the device is located in a car, train, boat, plane, or other vehicle. Furthermore, the system 100 and methods may include enhancing or even reducing the quality of the content based on bandwidth constraints, the types of services the user of the device has subscribed to, the type of the device requesting the content, based on any factor, or any combination thereof.

Figure 1:
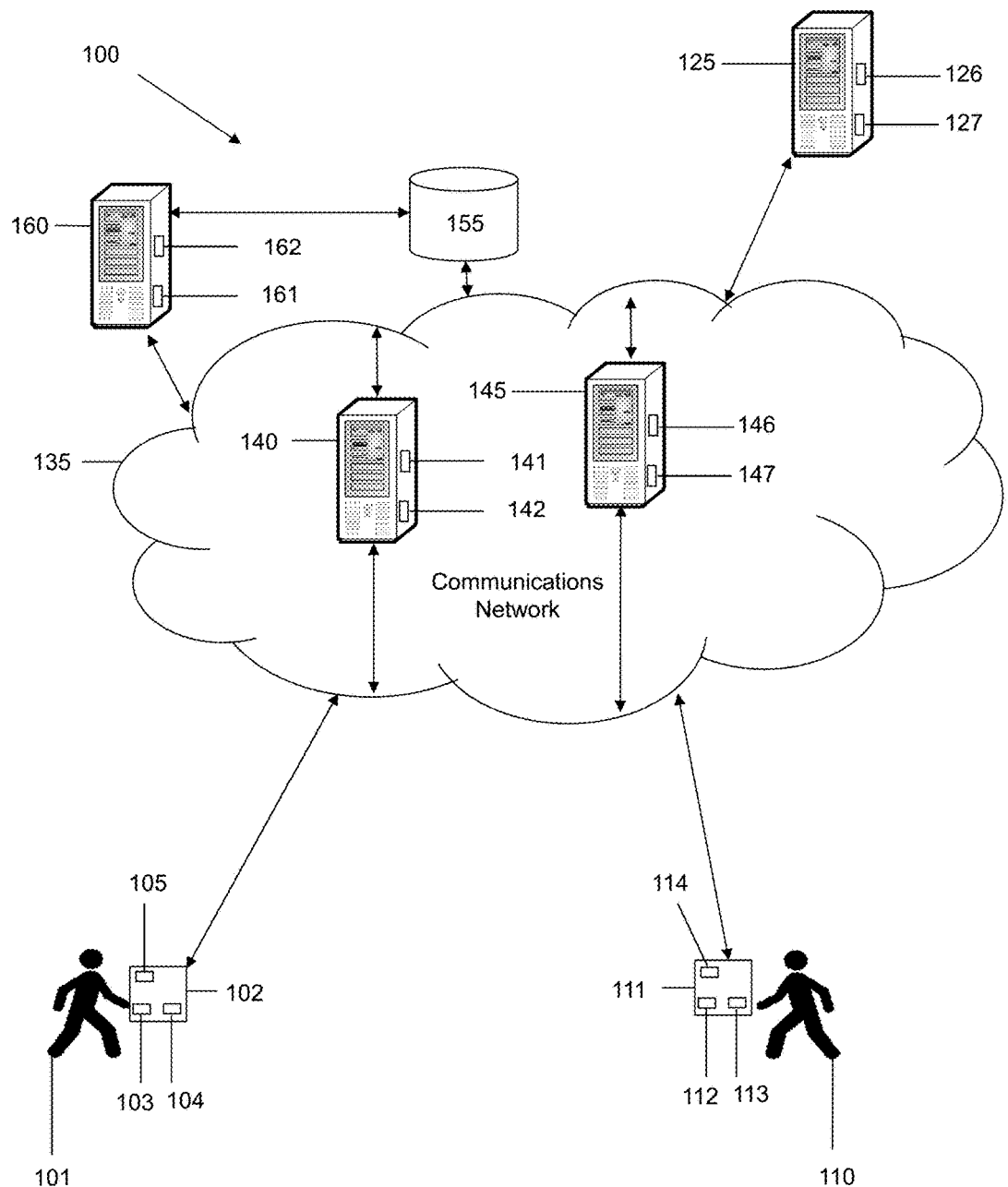
FIG. 1 is a schematic diagram of a system for providing video motion augmentation according to an embodiment of the present disclosure.

As shown in FIG. 1, a system 100 for providing video motion augmentation is disclosed. The system 100 may be configured to support, but is not limited to supporting, content delivery services, content enhancement and augmentation services, cloud computing services, satellite services, telephone services, voice-over-internet protocol services (VoIP), software as a service (SaaS) applications, gaming applications and services, productivity applications and services, mobile applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with communications network 135. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include a sensor 105, which may be a light sensor, an accelerometer, a gyroscope, a heart-rate sensor, a temperature sensor, a proximity sensor, a motion sensor, any type of sensor, or any combination thereof. In certain embodiments, the first user device 102 may be a computer, a laptop, a tablet device, a phablet, a server, a mobile device, a smartphone, a smart watch, or any other type of computing device. Illustratively, the first user device 102 is shown as a smartphone device in FIG. 1.

In addition to the first user 101, the system 100 may also include a second user 110, who may utilize a second user device 111 to also access data, content, and services, and to perform a variety of other functions. For example, the second user device 111 may be utilized by the second user 110 to transmit signals to request various types of content, services, and data provided by content and service providers associated with communications network 135 or any other network in the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include a sensor 114, which may be a light sensor, an accelerometer, a gyroscope, a heart-rate sensor, a temperature sensor, a proximity sensor, a motion sensor, any type of sensor, or any combination thereof. Similar to the first user device 102, in certain embodiments, the second user device 111 may be a computer, a laptop, a tablet device, a phablet, a server, a mobile device, a smartphone, a smart watch, or any other type of computing device. Illustratively, the second user device 111 is shown as a tablet device in FIG. 1.

In certain embodiments, first user device 102 and second user device 111 may have any number of software applications and/or application services stored and/or accessible thereon. For example, the first and second user devices 102, 111 may include cloud-based applications, media streaming applications, content-based applications, media-enhancing applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first user device 102 and the second user device 111 may include associated telephone numbers, device identities, or any other identifiers to uniquely identify the first and second user devices 102, 111.

The system 100 may also include a device 125, which may be any type of device including, but not limited to, a server, a computer, a smartphone, a phablet, a tablet, a computing device, an interactive device, a smart watch, or any combination thereof. In certain embodiments, the device 125 may communicate with any of the devices and components in the system 100, such as, but not limited to, the first and second user devices 102, 111. The device 125 may include a memory 126 that includes instructions, and a processor 127 that executes the instructions from the memory 126 to perform the various operations that are performed by the device 125. In certain embodiments, the processor 127 may be hardware, software, or a combination thereof. The device 125 may be a device owned and/or operated by a content provider, such as a television content provider, an audio content provider, a content generator, a content distributer, or a combination thereof. The first and second users 101, 110 may request various types of content, such as, but not limited to, video content, audio content, image content, text content, any type of content, or a combination thereof, from the content provider. The content provider may make the content directly accessible to the first and second user devices 102, 111 via the device 125, accessible via the communications network 135, or a combination thereof.

The system 100 may further include a communications network 135. The communications network 135 of the system 100 may be configured to link each of the devices in the system 100 to one another. Additionally, the communications network 135 may be configured to transmit, generate, and receive any information and data traversing the system 100. In certain embodiments, the communications network 135 may include any number of servers, databases, or other componentry. The communications network 135 may also include and be connected to a cloud-computing network, a wireless network, an Ethernet network, a satellite network, a broadband network, a cellular network, a private network, a cable network, the Internet, an internet protocol network, a multiprotocol label switching (MPLS) network, a content distribution network, any network or any combination thereof. Illustratively, servers 140 and 145 are shown as being included within communications network 135, and the communications network 135 is shown as a content delivery network. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the servers 140, 145, 160, the first user device 102, the second user device 111, the device 125, the communications network 135, or any combination thereof.

The database 155 may also store information and metadata obtained from the system 100, store metadata and other information associated with the first and second users 101, 110, store metadata and other information for media content, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information obtained from the communications network 135, store any information generated by or associated with the device 125, store historical data associated with the first and second users 101, 110, store content-related preferences, store algorithms for enhancing and/or augment media content, store various versions of media content, store device characteristics, store sensor data from the sensors 105, 114, store display characteristics, stored user-specified feedback associated with media content, store aggregated system-wide feedback, store any of the information disclosed for any of the operations and functions disclosed for the system 100 herewith, store any information traversing the system 100, or any combination thereof. Furthermore, the database 155 may be configured to process queries sent to it by any device in the system 100.

Figure 2:
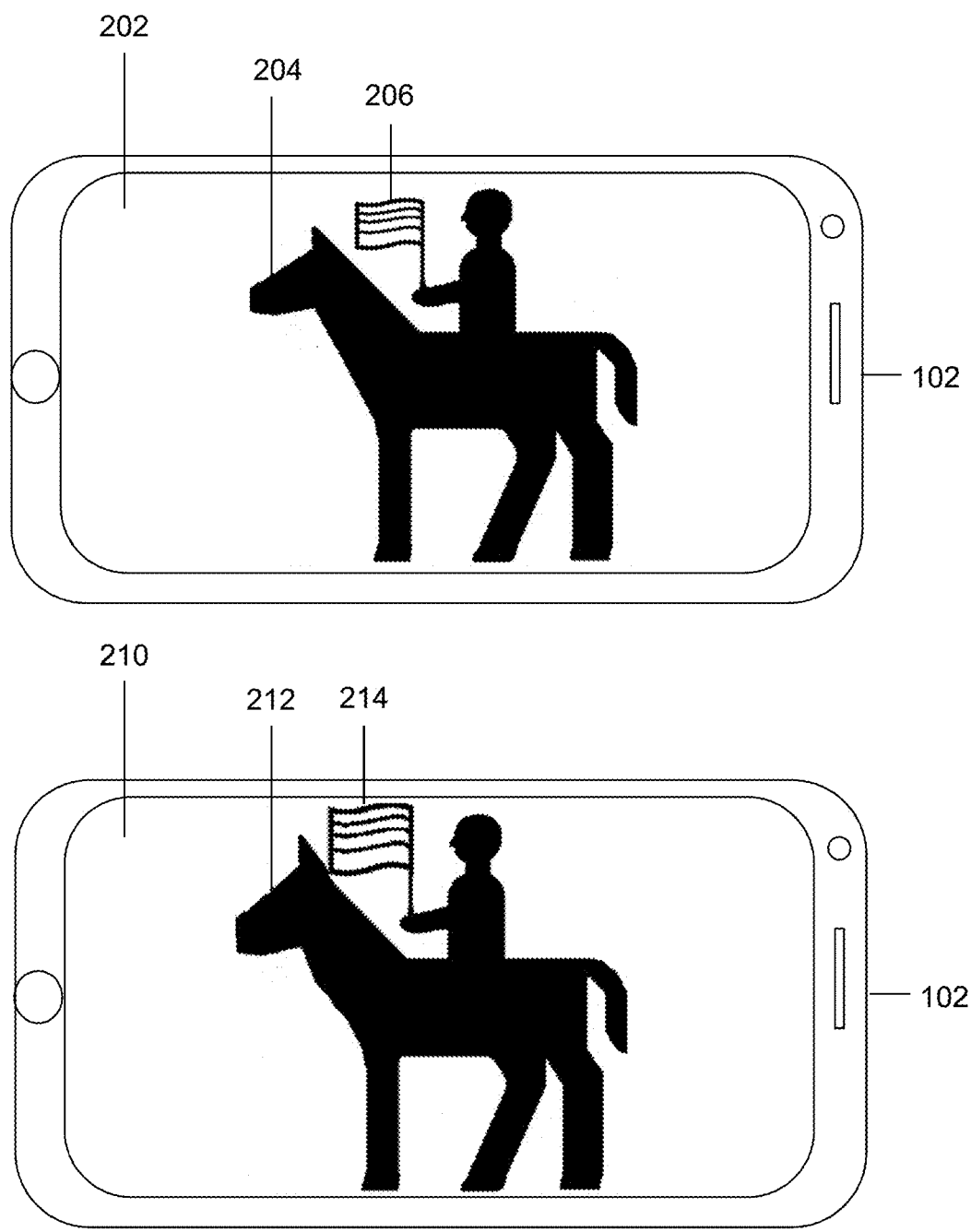
FIG. 2 depicts an original version of content displayed on an interface of a mobile device and a modified and augmented version of the content that is generated by the system of FIG. 1.

Operatively, the system 100 may provide video motion augmentation, as shown in the following exemplary scenarios. In a first example scenario and referring to FIGS. 1-2, the first user 101 may transmit, by utilizing the first user device 102, a request to access media content, such as a movie. The movie may include any number of scenes, one of which is illustrated in FIG. 2. The original scene 202 illustrated in FIG. 2 is a scene depicting a man holding a flag 206, while riding a horse. In this scene, the horse may be walking, and the flag 206 may be waving in wind as the man rides the horse. In certain embodiments, in response to the request to access the media content, the system 100 may begin transmitting the original version of the movie to the first user device 102, which includes original scene 202. As the movie is being delivered to the first user device 102 or at any other designated time, the first user device 102 may transmit a communication to the system 100, which indicates one or more device characteristics of the first user device 102 or even device characteristics of another device associated with the first user device 102. Additionally, one or more other inputs and/or metadata may also be provided to the system 100. The inputs may be provided from the media content itself, from the first user device 102 or from any other device, component, or program in the system 100.

The one or more device characteristics and/or inputs may be received by a content delivery service of the system 100, which is facilitated by the communications network 135. In certain embodiments, the device characteristics and/or other inputs may include, but are not limited to, a screen resolution for a screen of the first user device 102, processing power of the first user device 102, memory storage capacity of the first user device 102, a device model of the first user device 102, a device type of the first user device 102, the internet connectivity options that the first user device 102 is capable of utilizing and/or subscribed to, a current orientation of the first user device 102, an expected orientation of the first user device 102, the speed or acceleration at which the first user device 102 is moving, light data provided by a light sensor of the first user device 102, gyroscope data provided by a gyroscope of the first user device 102, temperature data from a temperature sensor of the first user device 102, any sensor data from any sensor of the first user device 102, any type of device characteristic, any type of metadata associated with the first user device 102, or any combination thereof.

In certain embodiments, metadata may also be provided to or made accessible to the system 100. The metadata, for example, may be metadata supplied by a content provider or other entity (even the first user 102), which may insert the metadata into the media content itself. Using the example from FIG. 2, a content provider that owns the movie file may insert metadata into the movie file. In certain embodiments, the metadata may indicate how the system 100 should enhance the content depending on a variety of factors, such as the type of device requesting the content. For example, the content provider may embed metadata in the movie file that specifies that certain action scenes in the movie file should be enhanced if the movie file is requested on a smartphone device or other device having a threshold display screen size or resolution capabilities. The metadata may also specify that the movie file should not be enhanced if the display screen size is larger than a certain threshold value. The metadata may include, but is not limited to, information indicating how to adjust media content based on a type of device requesting media content, based on whether motion content exists in the media content, based on whether a certain type of motion content exists in the media content (e.g. fast moving content, slow moving content, repetitive motion content, etc.), based on light levels associated with the device requesting the media content, based on the orientation of the device requesting the media content, based on a certain region of interest within the media content itself, based on accelerometer data obtain from an accelerometer of the device requesting the content, based on any type of sensor data, based on user subscriptions to connectivity options, based on any type of input, based on certain types of user feedback, based on certain types of system-wide feedback from many users, based on any other information, or a combination thereof.

After receiving the communication indicating the device characteristics of the first user device 102 and any inputs, and accessing any metadata, the system 100 may determine motion content or other content of the original version of the movie needs to be optimized for display on the first user device 102 based on the one or more device characteristics, any inputs received, and/or metadata. The determining may be performed by a server service of the system 100 in communication with the content delivery service. If the original version of the movie does not need to be optimized based on the device characteristics, inputs, and/or metadata, the system 100 may continue to deliver the original version of the movie to the first user device 102. However, if the original version of the movie needs to be optimized for display on the first user device 102, the server service of the system 100 may request motion enhancement (or enhancement of non-motion content) from a motion augmentation/enhancement service of the system 100.

The motion augmentation/enhancement service of the system 100 may utilize one or more available algorithms for enhancing the motion content (or non-motion content) to enhance and augment the motion content (or non-motion content) of the original version of the movie. During enhancement, the entire original version of the movie may be enhanced or certain portions of the original version of the movie may be enhanced to generate a second version of the movie including the enhancements. In doing so, the motion augmentation/enhancement service may re-encode the original version of the movie to create the second enhanced version of the movie, and provide the second enhanced version of the movie to the content delivery service. The system 100 may, in-real time, shift to delivering the second enhanced version of the movie to the first user device 102 so that the first user 101 may view the movie with the enhancements and without interruption. The second version of the movie may be delivered by the content delivery service of the system 100. The system 100 may repeat the processes described above as necessary, such as when new inputs to the system 100 are received.

Continuing with the example provided in FIG. 2, the system 100 may have detected an annotation and/or metadata supplied by a content provider that indicates that the motion content from original scene 202 should be enhanced when a smartphone device or other small screen device is requesting the movie. As a result, the system 100 may enhance the scene 202 to create a new scene 210 that includes a flag 214 that is a larger version of the flag 206 from scene 202. Additionally, the motion of the flag 214 in scene 210 may be more exaggerated and emphasized than the motion of the flag 206 in scene 202 because the motion of the flag 206 in scene 202 may not be readily perceived by the first user 102 using the first user device 102, which may be smartphone device. Similarly, the movement of the head 204 of the horse in scene 202 may not be readily perceived by the first user 101. The system 100 may enhance the head 204 of the horse to create an enlarged head 212 for the horse. Additionally, the head bobbing of the horse's head 204 may be exaggerated and emphasized in scene 210 as well so that the first user 101 may readily observe the head bobbing on the small screen of the first user device 102. Notably, the system 100 may provide the enhanced version of the movie before transmitting the original version of the movie to the first user 102 or during transmission of the original version of the movie. The movie may be updated as more device characteristics, inputs, and/or metadata are received by the system 100.

Figure 3:
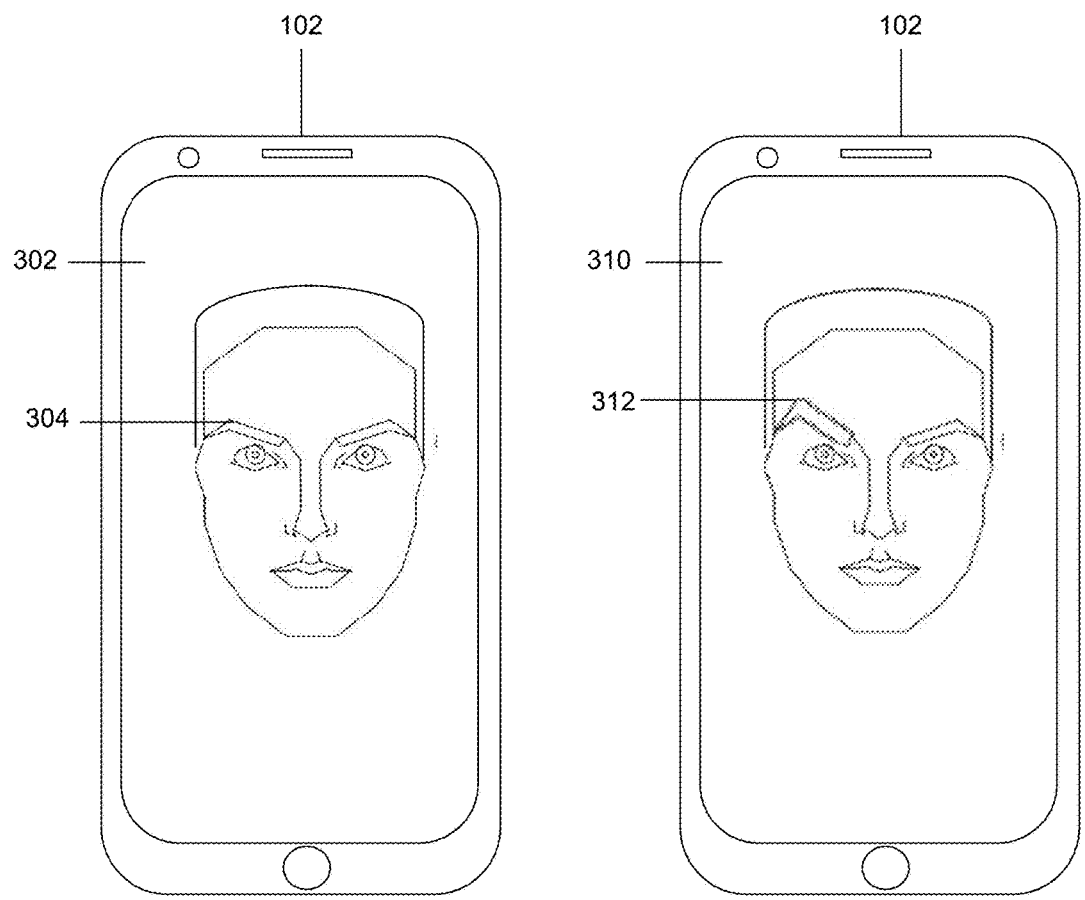
FIG. 3 depicts an original version of content displayed on an interface of a mobile device and a modified and augmented version of the content that is generated by the system of FIG. 1.

In a second example scenario and referring to FIGS. 1 and 3, the first user 101 may transmit, by utilizing the first user device 102, a request to access media content, such as a movie. The movie may include any number of scenes, one of which is illustrated in FIG. 3. The original scene 302 illustrated in FIG. 3 is a scene depicting the face of a man.

In certain embodiments, in response to the request to access the media content, the system 100 may begin transmitting the original version of the movie to the first user device 102, which includes original scene 302. As the movie is being delivered to the first user device 102 or at any other designated time, the first user device 102 may transmit a communication to the system 100, which indicates one or more device characteristics of the first user device 102. Additionally, one or more other inputs and/or metadata may also be provided to the system 100. The inputs may be provided from the media content itself, from the first user device 102 or from any other device, component, or program in the system 100.

After receiving the communication indicating the device characteristics of the first user device 102, along with any inputs and/or metadata, the system 100 may determine motion content or other content of the original version of the movie needs to be optimized for display on the first user device 102 based on the one or more device characteristics, any inputs received, and/or metadata. The determining may be performed by the server service of the system 100 in communication with the content delivery service. If the original version of the movie does not need to be optimized based on the device characteristics, inputs, and/or metadata, the system 100 may continue to deliver the original version of the scene 302 to the first user device 102. However, if the original version of the scene 302 needs to be optimized for display on the first user device 102, the server service of the system 100 may request motion enhancement (or enhancement of non-motion content) from a motion augmentation/enhancement service of the system 100.

The motion augmentation/enhancement service of the system 100 may utilize one or more available algorithms for enhancing the motion content (or non-motion content) to enhance and augment the motion content (or non-motion content) of the original version of the movie. During enhancement, the entire original version of the movie may be enhanced or certain portions of the original version of the movie may be enhanced to generate a second version of the movie including the enhancements. In doing so, the motion augmentation/enhancement service may re-encode the original version of the movie to create the second enhanced version of the movie, and provide the second enhanced version of the movie to the content delivery service. The system 100 may, in-real time, shift to delivering the second enhanced version of the movie to the first user device 102 so that the first user 101 may view the movie with the enhancements. The second version of the movie may be delivered by the content delivery service of the system 100. The system 100 may repeat the processes described above as necessary, such as when new inputs to the system 100 are received.

Continuing with the example provided in FIG. 3, the system 100 may detect, based on the device characteristics and/or object-specific rules, that the first user device 102 is a smartphone device and that the motion associated with the eyebrow 304 in scene 302 would not be perceived on the small screen of the first user device 102. As a result, the system 100 may enhance the scene 302 to create a new scene 310 that includes an exaggerated eyebrow 312 with exaggerated motion so that the eyebrow motion may be perceived by the first user 101 using the first user device 102. Notably, in certain embodiments, the system 100 may provide the enhanced version of the movie before transmitting the original version of the movie to the first user 102 or during transmission of the original version of the movie. The movie may be updated as more device characteristics, inputs, and/or metadata are received by the system 100.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving requests for content from any number of devices; transmitting a version of the media content to a requesting device; receiving communications indicating device characteristics of devices requesting media content; enhancing motion content or other content in media content based on the device characteristics; generating a new version of the media content based on the enhanced motion content or other content; obtaining other inputs associated with enhancing the media content; further enhancing the media content based on the other inputs; generating a newer version of the media content based on the further enhancements; transmitting the newer version of the media content to a requesting device; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a device 125, a communications network 135, a server 140, a server 145, a server 160, and a database 155. However, the system 100 may include multiple first user devices 102, multiple second user devices 111, multiple devices 125, multiple communications networks 135, multiple servers 140, multiple servers 145, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Figure 4:
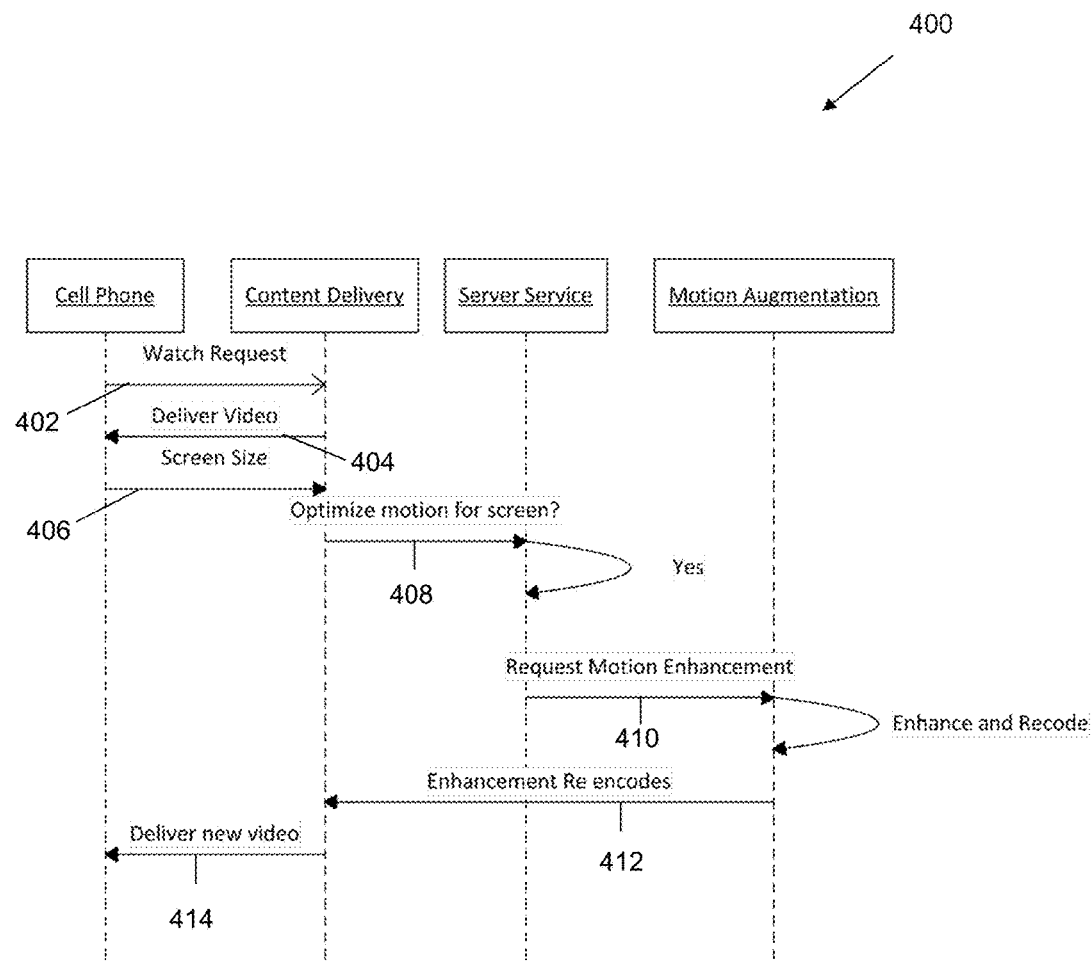
FIG. 4 is a flow diagram illustrating a sample method for providing video motion augmentation according to an embodiment of the present disclosure.

As shown in FIG. 4, an exemplary method 400 for providing video motion augmentation is schematically illustrated. The method 400 may include, at step 402, receiving a request from the first user device 102 (e.g. a cellphone) to access media content, such as a movie. The request may be received by the device 125, the server 140, the server 145, the server 160, the communications network 135, any combination thereof, or by utilizing any other appropriate program, system, or device. In certain embodiments, the request for the media content may be received by a content delivery service of the system 100, such as content delivery service provided via communications network 135. At step 404, the method 400 may include delivering and/or streaming the requested media content to the first user device 102. The media content that is delivered may be a first version of the media content.

While the media content is being delivered and/or streamed to the first user device 102 or at any other time, the method 400 may include, at step 406, receiving one or more device characteristics and/or other inputs from the first user device 102. The one or more device characteristics, for example, may be received by the content delivery service facilitated by the communications network 135. In certain embodiments, the device characteristics and/or other inputs may include, but are not limited to, a screen resolution for a screen of the first user device 102, processing power of the first user device 102, memory storage capacity of the first user device 102, a device model of the first user device 102, a type of device that the first user device 102 is, the internet connectivity options that the first user device 102 is capable of utilizing, a current orientation of the first user device 102, the speed or acceleration at which the first user device 102 is moving, light data provided by a light sensor of the first user device 102, gyroscope data provided by a gyroscope of the first user device 102, temperature data from a temperature sensor of the first user device 102, any sensor data from any sensor of the first user device 102, any type of device characteristic, any type of metadata associated with the first user device 102, or a combination thereof.

At step 408, the method 400 may include determining if motion content of the first version of the media content needs to be optimized for display on the first user device 102 based on the one or more device characteristics and/or inputs received. The determining may be performed by a server service of the system 100 in communication with the content delivery service. If the first version of the media content does not need to be optimized based on the device characteristics and/or inputs, the method 400 may continue to deliver the first version of the media content at step 404. However, if the first version of the media needs to be optimized for display on the first user device 102, the method 400 may include, at step 410, having the server service request motion enhancement from a motion augmentation/enhancement service of the system 100.

Figure 5:
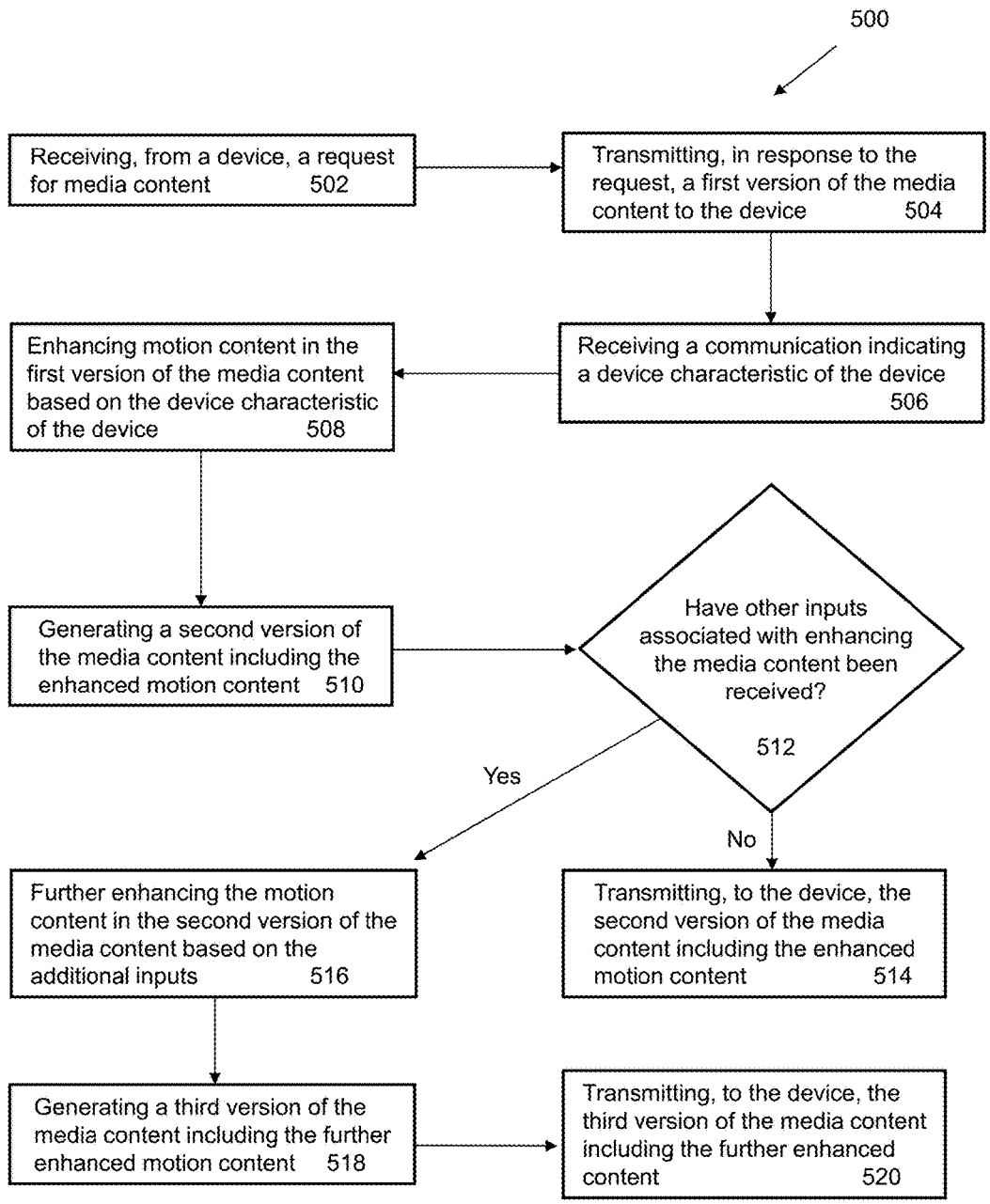
FIG. 5 is a flow diagram illustrating a sample method for providing video motion augmentation according to an embodiment of the present disclosure.

At step 412, the method 400 may include having the motion augmentation/enhancement service utilize one or more available algorithms for enhancing the motion content to enhance and augment the motion content of the first version of the media content. During enhancement, the entire first version of the media content may be enhanced or certain portions of the first version of the media content may be enhanced to generate a second version of the media content including the enhancements. In doing so, the motion augmentation/enhancement service may re-encode the first version of the media content to create the second version of the media content, and provide the second version of the media content to the content delivery service. At step 414, the method 400 may include delivering the second version of the media content including the enhanced content to the first user device 102 so that the first user 101 may view the movie with the enhancements. The second version of the media content may be delivered by the content delivery service of the system 100. The method 400 may be repeated as necessary, such as when new inputs to the system 100 are received As shown in FIG. 5, an exemplary method 500 for providing video motion augmentation is schematically illustrated. The method 500 may include, at step 502, receiving, from a device, a request for media content. In certain embodiments, the request for the media content may be received from and by utilizing the first user device 102, the second user device 111, the server 140, the server 145, the server 160, the communications network 135, any combination thereof, or by utilizing any other appropriate program, system, or device. Once the request for the media content is received, the method 500 may include, at step 504, transmitting, in response to the request, a first version of the media content to the device requested the media content. In certain embodiments, the first version of the media content may be transmitted by utilizing the device 125, the server 140, the server 145, the server 160, the communications network 135, any combination thereof, or by utilizing any other appropriate program, system, or device.

At step 506, the method 500 may include receiving a communication indicating one or more device characteristics of the device requesting the media content. For example, the one or more device characteristics may include, but are not limited to, a screen resolution for a screen of the device, processing power of the device, memory storage capacity of the device, a device model of the device, a type of the device, the internet connectivity options associated with the device, a physical orientation of the device, a power level of the device, display settings of the device, the speed or acceleration at which the device is moving, any type of device characteristic, any type of metadata associated with the device, or a combination thereof. Metadata may include, but is not limited to, device specifications, bandwidth constraints, internet and content delivery services subscribed to by the device, or any combination thereof. In certain embodiments, the communication indicating the one or more device characteristics of the device may be transmitted to components of the system 100 by utilizing the first user device 102, the second user device 111, the server 140, the server 145, the server 160, the communications network 135, any combination thereof, or by utilizing any other appropriate program, system, or device.

Once the one or more device characteristics of the device are received, the method 500 may include, at step 508 enhancing motion content or other content in the first version of the media content. The motion content may be enhanced by utilizing any type of motion enhancement or media content enhancement algorithms and techniques, such as, but not limited to, seam-filling algorithms, contrast enhancement algorithms, logarithmic transforms, content classification techniques, image inverting techniques, histogram-based techniques, video magnification techniques (e.g. Eulerian magnification or other techniques), temporal filtering techniques, spatial decomposition techniques, media content reconstruction techniques, optical flow algorithms, light amplification techniques, or any combination thereof. In certain embodiments, the motion content or other content of the first version of the media content may be enhanced by utilizing the first user device 102, the second user device 111, the device 125, the server 140, the server 145, the server 160, the communications network 135, any combination thereof, or by utilizing any other appropriate program, system, or device.

Once the motion content or other content of the first version of the media content is enhanced, the method 500 may include, at step 510, generating a second version of the media content that includes the enhancements. In certain embodiments, the generation of the second version of the media content may be performed by utilizing the first user device 102, the second user device 111, the device 125, the server 140, the server 145, the server 160, the communications network 135, any combination thereof, or by utilizing any other appropriate program, system, or device. At step 512, the method 500 may include determining if other inputs associated with enhancing the media content have been received by the system 100. For example, the other inputs may include, but are not limited to, light data provided by a light sensor of the first user device 102, gyroscope data provided by a gyroscope of the first user device 102, temperature data from a temperature sensor of the first user device 102, any sensor data from any sensor of the first user device 102, information identifying a theme associated with the media content (e.g. whether the media content is action content, drama content, comedic content, serious content, etc.), information indicating user-specific feedback or aggregated system-wide feedback relating to the media content, embedded metadata generated by content providers for the media content, other inputs, or a combination thereof. In certain embodiments, the other inputs may be provided by and/or received by the first user device 102, the second user device 111, the device 125, the server 140, the server 145, the server 160, the communications network 135, any combination thereof, or by utilizing any other appropriate program, system, or device.

If other inputs have not been received, the method 500 may include, at step 514, transmitting, to the first user device 102, the second version of the media content that includes the enhancements performed based on the one or more device characteristics. In certain embodiments, the transmitting may be performed by utilizing the device 125, the server 140, the server 145, the server 160, the communications network 135, any combination thereof, or by utilizing any other appropriate program, system, or device. If, however, other inputs have been received, the method 500 may include going from step 512 to step 516, which may include further enhancing the motion content in the second version of the media content based on the additional inputs. In certain embodiments, the further enhancing may be performed by utilizing the first user device 102, the second user device 111, the device 125, the server 140, the server 145, the server 160, the communications network 135, any combination thereof, or by utilizing any other appropriate program, system, or device. At step 518, the method 500 may include generated a third version of the media content based on the further enhancements performed. In certain embodiments, the generation of the third version of the media content may be performed by utilizing the first user device 102, the second user device 111, the device 125, the server 140, the server 145, the server 160, the communications network 135, any combination thereof, or by utilizing any other appropriate program, system, or device. Once the third version of the media content is generated, the method 500 may include, at step 520, transmitting the third version of the media content including the further enhanced content to the first user device 102 for display. In certain embodiments, the transmitting may be performed by utilizing the device 125, the server 140, the server 145, the server 160, the communications network 135, any combination thereof, or by utilizing any other appropriate program, system, or device. In certain embodiments, the method 500 may be repeated as necessary to tailor the media content to the first user device 102 or based on user preferences, such as when new inputs to the system 100 are received. Notably, the method 500 may further incorporate any of the features and functionality described for the system 100 or as otherwise described herein.

The systems and methods disclosed herein may include additional functionality and features. For example, the systems and methods may be configured to perform the motion enhancements on media content in real-time as the media content is delivered to a device requesting the content, as the media content is displayed on an interface of the device requesting the content, before the media content is delivered to the device requesting the content, before the media content is displayed on the device requesting the content, or a combination thereof. In certain embodiments, the enhancements to the motion content may include, but are not limited to, enlarging an image or a portion of an image in the motion content, reducing the size of an image or a portion of the image in the motion content, emphasizing and/or exaggerating movements occurring in the media content, reducing movements occurring in the media content, adding other content to the media content, adjusting lighting in the media content, adjust contrast levels in the media content, adjusting colors in the media content, adjusting saturation levels, adjusting any media content settings, adjusting the frames/second associated with the media content, adjusting the media content based on music occurring in the media content, adjusting the media content based on the type of situation occurring in the media content (e.g. action sequence, fight sequence, comedy sequence, drama sequence, high-speed chase scene, sports sequence, etc.), or any combination thereof.

In certain embodiments, the systems and methods may include enabling a content provider or other entity to insert metadata into media content, which indicates how the system 100 should enhance the content depending on the device requesting the content and/or the inputs received from enhancing the content. For example, metadata may be embedded in a movie file that specifies that certain action scenes in the movie file should be enhanced if the movie file is requested on a smartphone device or other device having a small screen or lower resolution capabilities. Using the same example, the metadata may specify that the movie file should not be enhanced if the device requesting the movie is a television system having a 60 inch display. The metadata may include, but is not limited to, information indicating how to adjust media content based on a type of device requesting media content, based on ambient light levels associated with the device requesting the media content, based on the orientation of the device requesting the media content, based on a certain region of interest within the media content itself, based on accelerometer data obtain from an accelerometer of the device requesting the content, based on any type of sensor data, based on user subscriptions, based on any type of input, based on certain types of user feedback, based on certain types of system-wide feedback from many users, based on any other information, or a combination thereof.

In certain embodiments, the systems and methods may include utilizing user-feedback or system-wide feedback from a plurality of users to either supplement the media content enhancements or override the media content enhancements. For example, the first user 101 may transmit a signal using the first user device 102 to indicate that the user does not want bright colors in the media content that the user is watching. Based on the feedback, the system 100 may dim the colors or otherwise reduce coloration in the media content accordingly. Feedback may include, but is not limited to, feedback instructing the system 100 to adjust colors in the media content, adjust motion in the media content, adjust motion for a specific scene in the media content, adjust motion for a specific thing shown in a scene in the media content, adjust contrast levels, adjust saturation levels, adjust resolution of the media content, adjust the frames/second of the media content, adjust the size of various objects displayed in the media content, adjust the speed at which objects move in the media content, adjust any parameter associated with the media content, adjust any type of motion augmentation or other augmentation, or any combination thereof. The feedback may be used to override default enhancements that are performed based on device characteristics or other inputs. For example, if the user does not like the enhancements performed on the content, the first user 102 may transmit a signal via the first user device 102 to further enhance or adjust the media content. The enhancements may be performed in real-time as the first user 102 is watching the content so that a seamless transition between the various enhanced versions of the media content is provided.

In certain embodiments, object-specific rules may be utilized to prompt the enhancement of the media content. For example, if the system 100 detects eyes, eyebrows, or a mouth of a character displayed in the media content, the system 100 may automatically enhance the media content if the device requesting the content has a low-resolution screen or limited display capabilities. Any type of rule may be created to prompt the enhancement of media content. For example, rules triggering the enhancement of the media content may include, but are not limited to, rules triggering enhancement when any motion content is detected in the media content, when a character is detected in the media content, when certain types of sequences are detected in the media content, when a certain rate of motion of pixels is detected in the media content, when environments in the media content change, when certain types of audio content are present in the media content, upon the occurrence of any type of condition, or any combination thereof.

In certain embodiments, any type of content may be enhanced including, but not limited to, audio content, still image content, text content, speech content, social media content, any type of content, or a combination thereof. In certain embodiments, the systems and methods may include determining different motion frequencies occurring in the media content (e.g. slow vs. fast frequencies), and adjusting enhancement of the media content based on the motion frequencies determined. In further embodiments, the systems and methods may include exporting and/or otherwise providing detected motion or proposed enhanced motions to various sensors 105, 114 or components that may express the detected motion or proposed enhanced motions. For example, detected motions or proposed enhanced motions may be provided to a haptic component of the device. The haptic component may output haptic feedback corresponding to the motion content that may be enhanced based on a device characteristic and/or certain inputs. Similarly, lights on the device may similarly output feedback corresponding to the motion content, vibration devices in the device may vibrate corresponding to the motion content, speakers may output feedback corresponding to the motion content, any type of component may produce an output corresponding to the motion content, or any combination thereof. In certain embodiments, the enhancement functionality provided by the system may be further supported based on "big data" analysis of the media content, such as for content adaptation purposes.

Figure 6:
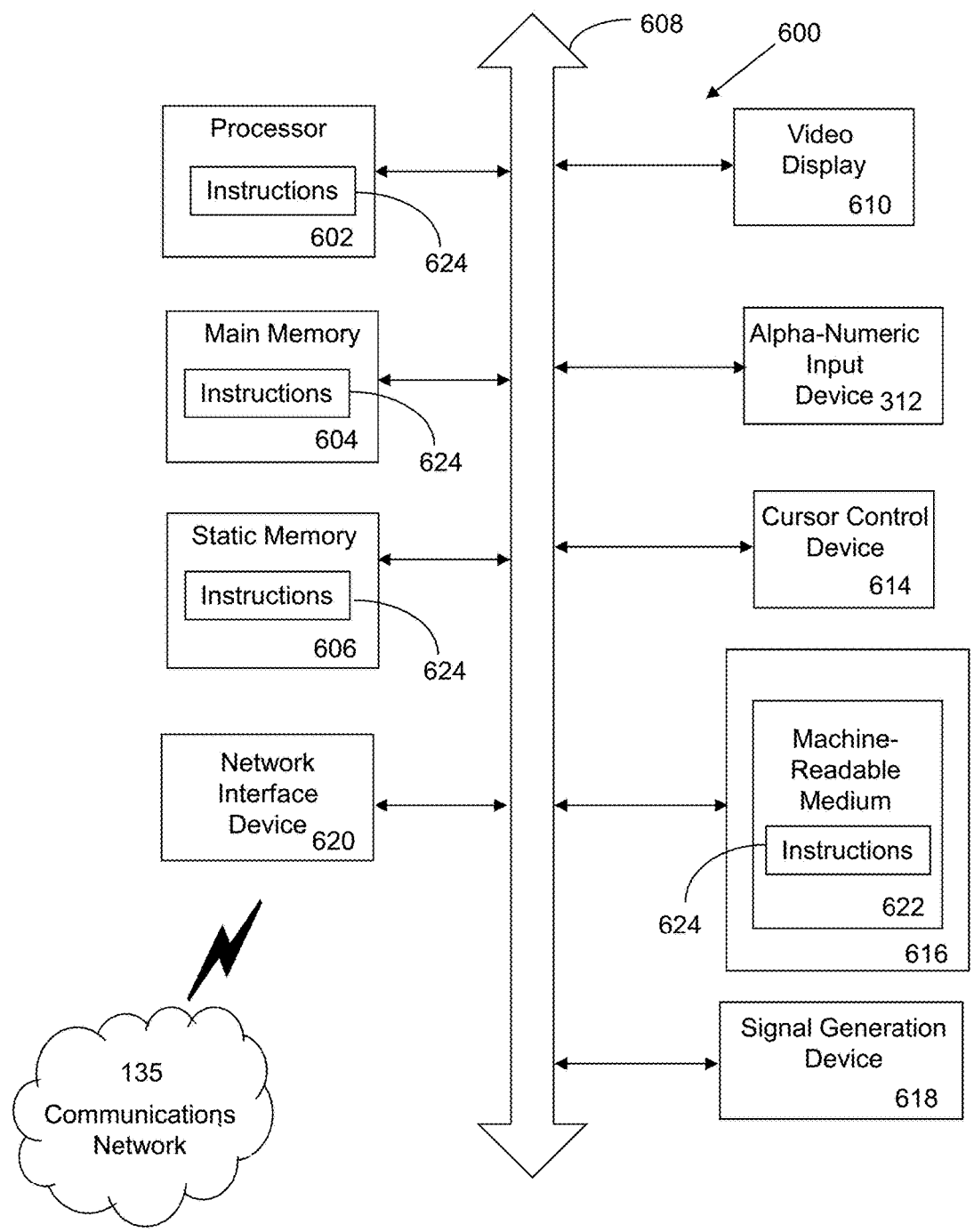
FIG. 6 is a schematic diagram of a machine in the form of a computer system within which a set of instructions, when executed, may cause the machine to perform any one or more of the methodologies or operations of the systems and methods for providing video motion augmentation.

Referring now also to FIG. 6, at least a portion of the methodologies and techniques described with respect to the exemplary embodiments of the system 100 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the device 125, the server 140, the server 145, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, another network, or a combination thereof, can send or receive voice, video or data, and communicate over the communications network 135, another network, or a combination thereof, using the instructions. The instructions 624 may further be transmitted or received over the communications network 135, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions;
   a processor that executes the instructions to perform operations, the operations comprising:
   receiving, while media content is being transmitted to a device, a communication indicating a device characteristic of the device;
   enhancing a portion of the media content based on the device characteristic of the device and based on a type of motion content in the media content, wherein the portion enhanced comprises the motion content in the media content; and
   generating a different version of the media content including the portion of the media content enhanced based on the device characteristic of the device and the type of motion content in the media content.

2. The system of claim 1, wherein the operations further comprise receiving a request for the media content from the device.

3. The system of claim 2, wherein the operations further comprise transmitting the media content to the device in response to the request.

4. The system of claim 1, wherein the operations further comprise transmitting, to the device, the different version of the media content for display on the device.

5. The system of claim 1, wherein the operations further comprise determining that an input associated with enhancing the media content has been received.

6. The system of claim 5, wherein the operations further comprise enhancing, based on the input, the different version of the media content to generate a further enhanced version of the media content.

7. The system of claim 1, wherein the operations further comprise enhancing the portion of the media content based on sensor data obtained from a sensor of the device.

8. The system of claim 1, wherein the operations further comprise receiving feedback from the device, and wherein the operations further comprise enhancing the media content based on the feedback.

9. The system of claim 1, wherein the operations further comprise exporting, to a haptic component of the device, information associated with the motion content enhanced based on the device characteristic and the type of motion content in the media content, and wherein the haptic component outputs haptic vibration feedback corresponding to the motion content.

10. The system of claim 1, wherein the operations further comprise enhancing the portion of the media content based on an orientation of the device.

11. The system of claim 1, wherein the operations further comprise enhancing the portion of the media content by enlarging an image in the portion of the media content.

12. The system of claim 1, wherein the operations further comprise enhancing the portion of the media content by reducing a size of an image in the portion of the media content.

13. The system of claim 1, wherein the operations further comprise enhancing the portion of the media content based on a light level associated with the device requesting the media content.

14. A method, comprising:
   accessing, while media content is being transmitted to a device, a communication indicating a device characteristic of the device;
   enhancing a portion of the media content based on the device characteristic of the device and based on a type of motion content in the media content, wherein the portion enhanced comprises the motion content in the media content; and
   generating, by utilizing instructions from a memory that are executed by a processor, a different version of the media content including the portion of the media content enhanced based on the device characteristic of the device and the type of motion content in the media content; and
   transmitting the different version of the media content to the device.

15. The method of claim 14, further comprising comprise dynamically enhancing a region of micro-movement in the media content.

16. The method of claim 14, further comprising enhancing the portion of the media content by emphasizing movements in the media content.

17. The method of claim 14, further comprising enhancing non-motion content in the media content based on the device characteristic and the type of motion content in the media content.

18. The method of claim 14, further comprising enhancing the portion of the media content based on metadata embedded within the media content.

19. The method of claim 14, further comprising enhancing the portion of the media content based on acceleration data obtained from an accelerometer of the device.

20. A non-transitory computer-readable device comprising instructions, which when executed by a processor, cause the processor to perform operations comprising:
   receiving a communication indicating a device characteristic of a device;
   enhancing a portion of media content based on the device characteristic of the device and based on a type of motion content in the media content, wherein the portion enhanced comprises the motion content in the media content; and
   creating a different version of the media content including the portion of the media content enhanced based on the device characteristic of the device and the type of motion content in the media content; and
   providing the different version of the media content to the device.

* * * * *